United States Patent
Ma et al.

(10) Patent No.: US 11,038,580 B2
(45) Date of Patent: Jun. 15, 2021

(54) METHOD FOR DETERMINING POLARIZATION INFORMATION AND RELATED DEVICE THEREOF

(71) Applicant: HUAWEI TECHNOLOGIES CO., LTD., Shenzhen (CN)

(72) Inventors: Teng Ma, Chengdu (CN); Kun Li, Chengdu (CN); Yi Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/003,949

(22) Filed: Aug. 26, 2020

(65) Prior Publication Data
US 2020/0395997 A1    Dec. 17, 2020

Related U.S. Application Data

(63) Continuation of application No. PCT/CN2018/077515, filed on Feb. 28, 2018.

(51) Int. Cl.
*H04B 7/10* (2017.01)
*H01Q 9/04* (2006.01)
*H01Q 21/24* (2006.01)
*H04B 1/16* (2006.01)

(52) U.S. Cl.
CPC ............. *H04B 7/10* (2013.01); *H01Q 9/045* (2013.01); *H01Q 21/245* (2013.01); *H04B 1/1607* (2013.01)

(58) Field of Classification Search
CPC ........ H04B 7/10; H04B 1/1607; H04B 7/061; H04B 7/0814; H01Q 9/045; H01Q 21/245
See application file for complete search history.

(56) References Cited

U.S. PATENT DOCUMENTS

| 8,213,794 B2 | 7/2012 | Wei et al. |
| 9,325,436 B2 | 4/2016 | Pratt et al. |
| 10,382,139 B2 * | 8/2019 | Rosenhouse ......... H04B 7/0417 |

FOREIGN PATENT DOCUMENTS

| CN | 1357931 A | 7/2002 |
| CN | 102803984 A | 11/2012 |
| CN | 102810731 A | 12/2012 |

(Continued)

*Primary Examiner* — Kabir A Timory
(74) *Attorney, Agent, or Firm* — Kilpatrick Townsend & Stockton LLP

(57) ABSTRACT

Various embodiments provide a method for determining polarization information and a device thereof. In those embodiments, a first polarization information set sent by a transmitting device can be received by the receiving device. The first polarization information set includes at least one piece of first polarization information. A quality set comprising at least one quality of a received signal can be determined by the receiving device. The first polarization information corresponds to a quality of the received signal in the quality set, and the received signal is sent by the transmitting device to the receiving device through a non-line-of-sight channel. An optimal quality in the quality set can be determined by the receiving device. The optimal quality has a minimum degradation degree of the received signal in the quality set. The receiving device can then send the first polarization information corresponding to the optimal quality to the transmitting device.

18 Claims, 8 Drawing Sheets

(56) References Cited

FOREIGN PATENT DOCUMENTS

| CN | 103338094 A | 10/2013 |
|---|---|---|
| CN | 105144472 A | 12/2015 |
| EP | 2797240 A1 | 10/2014 |
| KR | 20040039512 A | 5/2004 |

\* cited by examiner

METHOD FOR DETERMINING POLARIZATION INFORMATION AND RELATED DEVICE THEREOF

CROSS-REFERENCE TO RELATED APPLICATIONS

This application is a continuation of International Application No. PCT/CN2018/077515, filed on Feb. 28, 2018, the disclosure of which is hereby incorporated by reference in its entirety.

TECHNICAL FIELD

This application relates to the communications field, and in particular, to a method for determining polarization information and a related device thereof.

BACKGROUND

Wireless communications technologies include wireless access. For example, in conventional point-to-point microwave communication, if a wireless communication link between a transmitter (TX) and a receiver (RX) is not blocked by an obstacle, the link is referred to as a line of sight (LOS) link, and correspondingly, the wireless communication is LOS communication. On the contrary, if a wireless communication link between the transmitter and the receiver is blocked by an obstacle, the link is referred to as a non-line-of-sight (NLOS) link, and correspondingly, the wireless communication is NLOS communication. In the NLOS communication, due to blocking of the obstacle, a radio electromagnetic wave is usually transmitted by reflection, diffraction, penetration, or the like, causing a loss in transmission, and channel condition degradation. Main symptoms are that a received signal level (RSL) at an RX end is decreased, and a transmission capacity is reduced. If the RSL is lower than receiving sensitivity of the RX, it is considered that the wireless communication is interrupted. In the current era of digital transformation, wireless access available anytime and anywhere based on a wireless communication link has become a basic feature of communication. Therefore, how to reduce a channel loss caused by penetration or reflection in an NLOS link has attracted wide social concern.

A polarization pattern and a polarization direction are basic attributes of a radio electromagnetic wave and refer to a size and a direction of energy distribution of the electromagnetic wave. On a LOS link, a polarization direction of transmission at a TX end is a polarization direction of reception at an RX end. The polarization directions of antennas at both ends are consistent, and an RSL is rarely affected. In an NLOS scenario, a polarization pattern and a polarization direction of a polarized electromagnetic wave at the TX end change after the polarized electromagnetic wave after being reflected, diffracted, or penetrated. As a result, electric field strength and the direction of the electromagnetic wave change. Consequently, the RX end cannot receive the electromagnetic wave transmitted at the TX end with a minimum signal degradation degree, causing degradation of a received signal. Currently, there is a wireless device with a dual-polarized architecture (for example, HV polarization or positive and negative 45-degree polarization), isolation between two polarized channels is greater than 40 db, and the two polarized channels may be considered as two completely independent channels. When one polarized channel is severely degraded, the other polarized channel can still work normally, to protect the RX from a reception failure. Therefore, the RX that adopts the dual-polarized architecture can receive an electromagnetic wave in any polarization shape and direction, and the RSL of a signal may degrade no more than 3 db. RSL is affected not only by an energy loss caused by a failure of optimal matching between the TX end and the RX end, but by a polarization loss caused by a physical factor such as scattering or penetration by an obstacle. In a same penetration scenario (where an obstacle location, a transmitting device, and an incident angle are fixed), energy losses of electromagnetic waves caused by scattering and penetration by the obstacle vary depending on different polarization shapes or polarization directions. The RSL may decrease by 30 db or more. Such a loss cannot be predicted in advance.

In the NLOS scenario, an RSL loss of a received signal caused by polarization pattern and direction changes can be basically eliminated by using the dual-polarized architecture. Because polarization shapes or directions of electromagnetic waves transmitted at the TX end are different, energy losses caused by scattering or penetration by an obstacle are different. Therefore, degradation degrees of the received signal are also different. However, the losses cannot be predicted in advance, and energy losses of an electromagnetic wave in some polarization directions may still be huge. Consequently, in the existing dual-polarized architecture, an energy loss and a degradation degree of a corresponding received signal may still be large after an electromagnetic wave transmitted at the TX end is transmitted through the NLOS channel.

SUMMARY

Embodiments of this application provide a method for determining polarization information and a related device thereof, to resolve a problem that signal energy losses are different due to different polarization shapes and polarization directions of transmitted electromagnetic waves at a TX end.

A first aspect of the embodiments of this application provides a method for determining polarization information, including:

receiving, by a receiving device, a first polarization information set sent by a transmitting device, where the first polarization information set is obtained by the transmitting device by traversing polarization states in a polarization configuration diagram, there are a plurality of polarization states (polarization shapes and polarization directions) in the polarization configuration diagram, and the transmitting device sets the polarization states based on the polarization configuration diagram.

A manner in which the receiving device receives the first polarization information set is as follows: Each time the transmitting device switches a polarization state, the transmitting device sends the latest first polarization information to the receiving device, and the step is performed until the traversal is completed. Therefore, the first polarization information received by the receiving device is a set, and the set includes at least one piece of first polarization information.

Polarization information of the transmitting device is continually switched, and quality of a corresponding received signal is also constantly changing. The received signal is a signal sent by the transmitting device to the receiving device through a non-line-of-sight NLOS channel. Each type of first polarization information has unique corresponding quality of the received signal. Because the first polarization information is a set, the quality of the received signal is also a set.

The method further includes: determining, by the receiving device, a quality set of the received signal, where the quality set includes at least one piece of quality.

Then, the receiving device determines optimal quality in the quality set. In this embodiment, the optimal quality is quality that is in the quality set and that minimizes a degradation degree of the received signal.

After determining the optimal quality, the receiving device reversely deduces the first polarization information corresponding to the optimal quality, and sends the first polarization information to the transmitting device.

This embodiment has the following advantages: When the non-line-of-sight NLOS channel changes, after receiving the first polarization information set sent by the transmitting device, the receiving device determines a first quality set of the received signal based on the first polarization information set. The first polarization information in the first polarization information set is in a one-to-one correspondence with first quality in the first quality set, and the receiving device determines first optimal quality in the first quality set, where the first optimal quality is quality corresponding to a received signal that is in the first quality set and that minimizes a degradation degree of the received signal. Then, the receiving device sends first optimal polarization information corresponding to the first optimal quality to the transmitting device, where the first optimal polarization information is used by the transmitting device to determine a polarization shape and a polarization direction of a transmitted electromagnetic wave. Therefore, compared with the prior art in which a signal degradation status is unknown caused by an unknown energy loss caused after an electromagnetic wave is transmitted based on one piece of polarization information, in this application, regardless of how the NLOS channel changes, the receiving device can always select the first optimal quality from the first quality set of the received signal, to determine the first optimal polarization information corresponding to the first optimal quality, where the first optimal polarization information is used to determine polarization of the transmitted electromagnetic wave, and the first quality of the received signal can reflect quality condition of the received signal. Therefore, the transmitting device only needs to transmit the electromagnetic wave based on the first optimal polarization information. In this case, the degradation degree of the received signal is the lowest, so that a signal loss caused by electromagnetic waves that are in different polarization directions and polarization shapes and that are transmitted at the TX end, and by a physical factor such as penetration or scattering in the NLOS channel is the lowest.

According to the first aspect, in a first implementation of the first aspect of this application, after the receiving, by a receiving device, a first polarization information set sent by a transmitting device, the method further includes:

determining, by the receiving device, a second polarization information set, where second polarization information includes a polarization shape and a polarization direction, and the receiving device may set a polarization state of the receiving device based on the second polarization information.

Each piece of first polarization information corresponds to unique second polarization information. Because the first polarization information is a set, the second polarization information is also a set.

In this embodiment, when the receiving device uses a dual-polarized antenna, the receiving device may adapt to a transmitted electromagnetic wave with any first polarization information. When the receiving device uses a full-polarized antenna, the polarization state of the receiving device also needs to change with a change of the first polarization information sent by the transmitting device, to match with a polarization state of the transmitting device. A case in which the full-polarized antenna is used as an example is described in the embodiments, and diversity of solution implementation is increased.

According to the first implementation of the first aspect, in a second implementation of the first aspect of the embodiments of this application, when polarization information of the transmitting device is the first polarization information, the receiving device needs to determine the second polarization information corresponding to the first polarization information. A specific determining manner is as follows: The receiving device determines polarization information that is in a third polarization information set and that indicates the minimal degradation degree of the received signal, where the polarization information is the required second polarization information.

It should be noted that the third polarization information set includes at least one piece of third polarization information, and the third polarization information includes a polarization shape and a polarization direction.

In this embodiment, a manner of determining the second polarization information is described. It can be learned that the second polarization information and the first polarization information may be optimally matched, so that an energy loss caused because the polarization state of the transmitting device does not match the polarization state of the receiving device is minimized or even eliminated.

According to the first or the second implementation of the first aspect, in a third implementation of the first aspect of this application, after the determining, by the receiving device, optimal quality in the quality set, the method further includes:

controlling, by the receiving device, a polarization shape and a polarization direction of the receiving device based on the second polarization information corresponding to the optimal quality.

In this embodiment, a function of the second polarization information corresponding to the optimal quality is described, thereby improving integrity of the solution.

According to the first aspect and the first or the second implementation of the first aspect, in a fourth implementation of the first aspect of the embodiments of this application, the determining, by the receiving device, a quality set of a received signal includes:

detecting, by the receiving device, the received signal; and determining, by the receiving device based on a detection result, quality of the received signal corresponding to each piece of first polarization information.

In this embodiment, a manner of determining the quality set of the received signal is described, thereby improving feasibility of the solution.

According to the first aspect and the first or the second implementation of the first aspect, in a fifth implementation of the first aspect of the embodiments of this application, the quality is at least one of a receive level power RSL, a signal-to-noise ratio SNR, and a signal to interference plus noise ratio SINR of the received signal.

In this embodiment, specific parameters of an instruction of the received signal are described, thereby improving practicability of the solution.

According to the first aspect and the first or the second implementation of the first aspect, in a sixth implementation of the first aspect of the embodiments of this application, the method further includes:

when the degradation degree of the received signal is greater than a preset threshold, triggering, by the receiving device, the step of receiving the first polarization information set sent by the transmitting device; or after a preset time periodicity is reached, triggering, by the receiving device, the step of receiving the first polarization information set sent by the transmitting device.

In this embodiment, a condition under which the transmitting device receives the first polarization information set is described, thereby improving feasibility and flexibility of the solution.

A second aspect of the embodiments of this application provides a method for determining polarization information, including:

generating, by the transmitting device, a first polarization information set. Each time the transmitting device switches a polarization state, the transmitting device sends the latest first polarization information to a receiving device, and the step is performed until the traversal is completed, so that the receiving device receives the first polarization information set. The first polarization information set includes at least one piece of first polarization information.

Polarization information of the transmitting device is continually switched, and quality of a corresponding received signal is also constantly changing. The received signal is a signal sent by the transmitting device to the receiving device through a non-line-of-sight NLOS channel. Each type of first polarization information has unique corresponding quality of the received signal. Because the first polarization information is a set, the quality of the received signal is also a set. The quality set of the received signal is determined by the receiving device based on the first polarization information set.

The method further includes: receiving, by the transmitting device, first optimal polarization information sent by the receiving device, where the first optimal polarization information belongs to the first polarization information set, the first optimal polarization information corresponds to the optimal quality, and the optimal quality is determined by the receiving device. A manner of determining the optimal quality is specifically that: The receiving device detects a received signal corresponding to each type of first polarization information, to determine a received signal with a minimum signal degradation degree, where quality of the received signal with the minimum signal degradation degree is the optimal quality in the quality set.

The transmitting device may set a polarization shape and a polarization state of a transmitted electromagnetic wave to a polarization shape and a polarization state that correspond to the first optimal polarization information.

In this application, regardless of how the NLOS channel changes, the transmitting device sends the first polarization information set to the receiving device, so that the receiving device determines the quality set of the received signal corresponding to the first polarization information set, and then the receiving device determines quality with a minimum signal degradation degree, and sends the first optimal polarization information corresponding to the quality with the minimum signal degradation degree to the transmitting device. Therefore, the transmitting device only needs to transmit the electromagnetic wave based on the first optimal polarization information. In this case, the degradation degree of the received signal is the lowest, so that a signal loss caused by electromagnetic waves that are in different polarization directions and polarization shapes and that are transmitted at the TX end, and by a physical factor such as penetration or scattering in the NLOS channel is the lowest.

According to the second aspect, in a first implementation of the second aspect of this application, an associated control channel and a data channel are on a same physical channel. Therefore, after carrying the first polarization information set in control information of the associated control channel, the transmitting device sends the control information to the receiving device, so that information can be transferred between the receiving device and the transmitting device; or a control channel of a bypass control channel and a data channel are on different physical channels. The transmitting device sends the first polarization information to the receiving device through the bypass control channel. After receiving data streams, the receiving device cannot determine which data stream carries the first polarization information. Therefore, the data streams need to be matched with the first polarization information, and then the first polarization information is determined based on the data streams and matching results, until all first polarization information in the first polarization information set is determined.

In this embodiment, a manner of transferring the first polarization information set is specifically described, thereby improving feasibility of the solution.

According to the second aspect and the first implementation of the first aspect, in a second implementation of the second aspect of this application, the method further includes:

when the degradation degree of the received signal is greater than a preset threshold, triggering, by the transmitting device, the step of generating the first polarization information set; or after a preset time periodicity is reached, triggering, by the transmitting device, the step of generating the first polarization information set.

In this embodiment, a traversal condition of the transmitting device is described, thereby improving feasibility and flexibility of the solution.

A third aspect of the embodiments of this application provides a receiving device, including:

an obtaining unit, configured to obtain a first polarization information set sent by the transmitting device through a control channel, where the first polarization information set includes at least one piece of first polarization information, and the first polarization information includes a polarization shape and a polarization direction of a transmitted electromagnetic wave of the transmitting device;

a determining unit, configured to determine a quality set of a received signal, where the quality set includes at least one piece of quality, the first polarization information corresponds to unique quality, and the received signal is a signal sent by the transmitting device to the receiving device through a non-line-of-sight NLOS channel, and the determining unit is further configured to determine optimal quality in the quality set, where the optimal quality is quality that is in the quality set and that minimizes a degradation degree of the received signal; and a sending unit, configured to send the first polarization information corresponding to the optimal quality to the transmitting device.

According to the third aspect, in a first implementation of the third aspect of the embodiments of this application, the determining unit is further configured to determine a second polarization information set, where the first polarization information in the first polarization information set corresponds to unique second polarization information in the second polarization information set, and the second polarization information includes a polarization shape and a polarization direction of the receiving device.

According to the first implementation of the third aspect, in a second implementation of the third aspect of the embodiments of this application, when polarization information of the transmitting device is the first polarization information, the second polarization information is polarization information that is in a third polarization information set and that indicates the minimal degradation degree of the received signal, the third polarization information set includes at least one piece of third polarization information, and the third polarization information includes the polarization shape and the polarization direction of the receiving device.

According to the first implementation or the second implementation of the third aspect, in a third implementation of the third aspect of the embodiments of this application, the device includes:

a control unit, further configured to control the polarization shape and the polarization direction of the receiving device based on the second polarization information corresponding to the optimal quality.

According to the third aspect and the first implementation or the second implementation of the third aspect, in a fourth implementation of the third aspect of the embodiments of this application, the determining unit includes:

a detection module, configured to detect the received signal; and a determining module, configured to determine, based on a detection result, quality of the received signal corresponding to each piece of first polarization information.

According to the third aspect and the first implementation or the second implementation of the third aspect, in a fifth implementation of the third aspect of the embodiments of this application, the quality of the received signal is at least one of a receive level power RSL, a signal-to-noise ratio SNR, and a signal to interference plus noise ratio SINR of the received signal.

According to the third aspect and the first implementation or the second implementation of the third aspect, in a sixth implementation of the third aspect of the embodiments of this application, the receiving device further includes a trigger unit, and the trigger unit is further configured to: when the degradation degree of the received signal is greater than a preset threshold, trigger the step of receiving the first polarization information set sent by the transmitting device; or the trigger unit is further configured to: after a preset time periodicity is reached, trigger the step of receiving the first polarization information set sent by the transmitting device.

A fourth aspect of the embodiments of this application provides a transmitting device, including:

a generation unit, configured to generate a first polarization information set, where the first polarization information set includes at least one piece of first polarization information, and the first polarization information includes a polarization shape and a polarization direction of the transmitted electromagnetic wave of the transmitting device;

a sending unit, configured to send the first polarization information set to the receiving device, where the first polarization information set is used by the receiving device to determine a quality set of a received signal, the quality set includes at least one piece of quality, the first polarization information corresponds to unique quality, and the received signal is a signal sent by the transmitting device to the receiving device through a non-line-of-sight NLOS channel;

a receiving unit, configured to receive first optimal polarization information sent by the receiving device, where the first optimal polarization information belongs to the first polarization information set, the first optimal polarization information corresponds to the optimal quality, the optimal quality is determined by the receiving device, and the optimal quality is quality that is in the quality set and that minimizes a degradation degree of the received signal; and a determining unit, configured to determine the polarization shape and the polarization direction of the transmitted electromagnetic wave based on the first optimal polarization information.

According to the fourth aspect, in a first implementation of the fourth aspect of the embodiments of this application, the sending unit includes:

an information carrying module, configured to carry the first polarization information set in control information of an associated control channel; and a first sending module, configured to send the control information to the receiving device; or a second sending module, configured to send the first polarization information set to the receiving device through a bypass control channel, so that when the receiving device determines that the first polarization information is transmitted through the bypass control channel, the receiving device matches a received data stream with the first polarization information, and then determines the first polarization information based on the data stream and a matching result, until all first polarization information in the first polarization information set is determined.

According to the fourth aspect and the first implementation of the fourth aspect, in a second implementation of the fourth aspect of the embodiments of this application, the transmitting device further includes a trigger unit, and the trigger unit is configured to: when the degradation degree of the received signal is greater than a preset threshold, trigger the step of generating the first polarization information set; or the trigger unit is configured to: after a preset time periodicity is reached, trigger the step of generating the first polarization information set.

A fifth aspect of the embodiments of this application provides a receiving device. The receiving device includes a controller, a receiver, and a transmitter; where the receiver is configured to obtain a first polarization information set sent by the transmitting device through a control channel, where the first polarization information set includes at least one piece of first polarization information, and the first polarization information includes a polarization shape and a polarization direction of a transmitted electromagnetic wave of the transmitting device;

the controller is configured to determine a quality set of a received signal, where the quality set includes at least one piece of quality, the first polarization information corresponds to unique quality, and the received signal is a signal sent by the transmitting device to the receiving device through a non-line-of-sight NLOS channel, and the controller is further configured to determine optimal quality in the quality set, where the optimal quality is quality that is in the quality set and that minimizes a degradation degree of the received signal; and the transmitter is configured to send the first polarization information corresponding to the optimal quality to the transmitting device.

According to the fifth aspect, in a first implementation of the fifth aspect of the embodiments of this application, the controller is further configured to determine a second polarization information set, where the first polarization information in the first polarization information set corresponds to unique second polarization information in the second polarization information set, and the second polarization information includes a polarization shape and a polarization direction of the receiving device.

According to the first implementation of the fifth aspect, in a second implementation of the fifth aspect of the embodiments of this application, when polarization information of the transmitting device is the first polarization information, the second polarization information is polarization information that is in a third polarization information set and that indicates the minimal degradation degree of the received signal, the third polarization information set includes at least one piece of third polarization information, and the third polarization information includes the polarization shape and the polarization direction of the receiving device.

According to the first implementation or the second implementation of the fifth aspect, in a third implementation of the fifth aspect of the embodiments of this application, the receiving device further includes a feeding network and an antenna; where the feeding network is configured to control a polarization shape and a polarization direction of the antenna based on the second polarization information corresponding to the optimal quality.

According to the fifth aspect and the first implementation or the second implementation of the fifth aspect, in a fourth implementation of the fifth aspect of the embodiments of this application, the receiving device further includes a radio frequency circuit and/or a baseband circuit; where the radio frequency circuit and/or the baseband circuit are/is configured to detect the received signal; and configured to determine, based on a detection result, quality of the received signal corresponding to each piece of first polarization information.

According to the fifth aspect and the first implementation or the second implementation of the fifth aspect, in a fifth implementation of the fifth aspect of the embodiments of this application, the quality of the received signal determined by the controller is at least one of a receive level power RSL, a signal-to-noise ratio SNR, and a signal to interference plus noise ratio SINR of the received signal.

According to the fifth aspect and the first implementation or the second implementation of the fifth aspect, in a sixth implementation of the fifth aspect of the embodiments of this application, the controller includes a first interface, a second interface, and a third interface, and the first interface of the controller is connected to the transmitting device through the control channel, where the receiving device further includes a radio frequency circuit and/or a baseband circuit, and the second interface of the controller is connected to at least one of the radio frequency circuit and the baseband circuit; and the receiving device further includes a feeding network and an antenna, the third interface of the controller is connected to the feeding network, and the feeding network is connected to the antenna.

According to the fifth aspect and the first implementation or the second implementation of the fifth aspect, in a sixth implementation of the fifth aspect of the embodiments of this application, the controller is further configured to: when the degradation degree of the received signal is greater than a preset threshold, trigger the step of receiving the first polarization information set sent by the transmitting device; or the controller is further configured to: after a preset time periodicity is reached, trigger the step of receiving the first polarization information set sent by the transmitting device.

A sixth aspect of the embodiments of this application provides a transmitting device, including:

a controller, configured to generate a first polarization information set, where the first polarization information set includes at least one piece of first polarization information, and the first polarization information includes a polarization shape and a polarization direction of the transmitted electromagnetic wave of the transmitting device;

a transmitter, configured to send the first polarization information set to the receiving device, where the first polarization information set is used by the receiving device to determine a quality set of a received signal, the quality set includes at least one piece of quality, the first polarization information corresponds to unique quality, and the received signal is a signal sent by the transmitting device to the receiving device through a non-line-of-sight NLOS channel; and a receiver, configured to receive first optimal polarization information sent by the receiving device, where the first optimal polarization information belongs to the first polarization information set, the first optimal polarization information corresponds to the optimal quality, the optimal quality is determined by the receiving device, and the optimal quality is quality that is in the quality set and that minimizes a degradation degree of the received signal, where the controller is further configured to determine the polarization shape and the polarization direction of the transmitted electromagnetic wave based on the first optimal polarization information.

According to the sixth aspect, in a first implementation of the sixth aspect of the embodiments of this application, the transmitter is specifically configured to: carry the first polarization information set in control information of an associated control channel; and send the control information to the receiving device; or the transmitter is specifically configured to send the first polarization information set to the receiving device through a bypass control channel, so that when the receiving device determines that the first polarization information is transmitted through the bypass control channel, the receiving device matches a received data stream with the first polarization information, and then determines the first polarization information based on the data stream and a matching result, until all first polarization information in the first polarization information set is determined.

According to the sixth aspect and the first implementation of the sixth aspect, in a fourth implementation of the sixth aspect of the embodiments of this application, the controller includes a first interface and a second interface, and the first interface of the controller is connected to the receiving device through the control channel;

the transmitting device further includes a feeding network, the feeding network includes a first interface, a second interface, and a third interface, and the second interface of the controller is connected to the first interface of the feeding network;

the transmitting device further includes a radio frequency circuit and/or a baseband circuit, and the second interface of the feeding network is connected to at least one of the radio frequency circuit and the baseband circuit; and the transmitting device further includes an antenna, and the third interface of the feeding network is connected to the antenna.

According to the sixth aspect and the first implementation of the sixth aspect, in a fourth implementation of the sixth aspect of the embodiments of this application, the controller is further configured to: when the degradation degree of the received signal is greater than a preset threshold, trigger the step of generating the first polarization information set; or the controller is further configured to: after a preset time periodicity is reached, trigger the step of generating the first polarization information set.

A seventh aspect of this application provides a computer-readable storage medium. The computer-readable storage medium stores an instruction, and when the instruction is run on a computer, the computer is enabled to perform the steps of the method according to the foregoing aspects.

An eighth aspect of this application provides a computer program product including an instruction, and when the computer program product is run on a computer, the computer is enabled to perform the method according to the foregoing aspects.

DESCRIPTION OF EMBODIMENTS

The following clearly and completely describes the technical solutions in this application with reference to the accompanying drawings in this application. Apparently, the described embodiments are merely some rather than all of the embodiments of this application. In the specification, claims, and accompanying drawings of this application, the terms "first", "second", "third", "fourth", and the like are intended to distinguish similar objects but do not need to be used to describe a specific order or sequence. Moreover, the terms "include", "contain" and any other variants mean to cover the non-exclusive inclusion, for example, a process, method, system, product, or device that includes a list of steps, functions, or units is not necessarily limited to the expressly listed steps, functions, or units, but may include other steps, functions, or units not expressly listed or inherent to such a process, method, product, or device.

Figure 1:
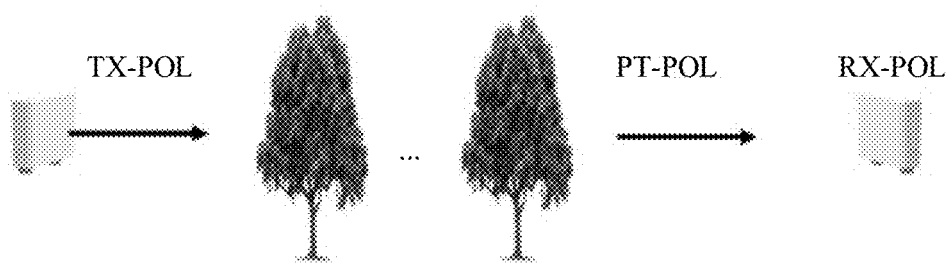
FIG. 1 is a polarization state change diagram of an NLOS channel according to an embodiment.

FIG. 1 is a schematic diagram of propagation of an electromagnetic wave in an NLOS channel. The radio electromagnetic wave sent by a TX device on the left side enters the NLOS channel in which a transmission status cannot be predicted. In the figure, X trees (X≥1, and X is a positive integer) are used to represent an NLOS channel in actual practice, the radio electromagnetic wave is transmitted in the NLOS channel and received by an RX device on the right side after being scattered, reflected for multiple times, and penetrated. The TX device transmits the electromagnetic wave by controlling an antenna of the TX device. The electromagnetic wave has a polarization state, which is referred to as a transmitter polarization state (TX-POL, transmitter polarization). After the electromagnetic wave passes through the NLOS channel, a penetrated wave in another polarization state is generated, which is referred to as a transferred wave polarization state (PT-POL, particular transfer polarization). The penetrated wave arrives at an RX end, and the RX end receives the penetrated wave in a new polarization state, which is referred to as a receiver polarization state (RX-POL, receiver polarization). For the electromagnetic wave whose polarization state is TX-POL, there may be two types of defects that cause an energy loss after the electromagnetic wave passes through the NLOS channel: 1. The PT-POL and the RX-POL cannot be optimally matched, and consequently, the transmitted electromagnetic wave cannot be received by the RX with a minimum energy loss. 2. After electromagnetic waves in different TX-POL states pass through the NLOS channel, different energy losses are caused due to a physical factor such as penetration or refraction in the NLOS channel. In addition, this physical defect is inevitable. For the first type of defect, the energy loss may be reduced or even eliminated by controlling the RX-POL. A solution to the second type of defect is provided in the embodiments of this application.

Figure 2:
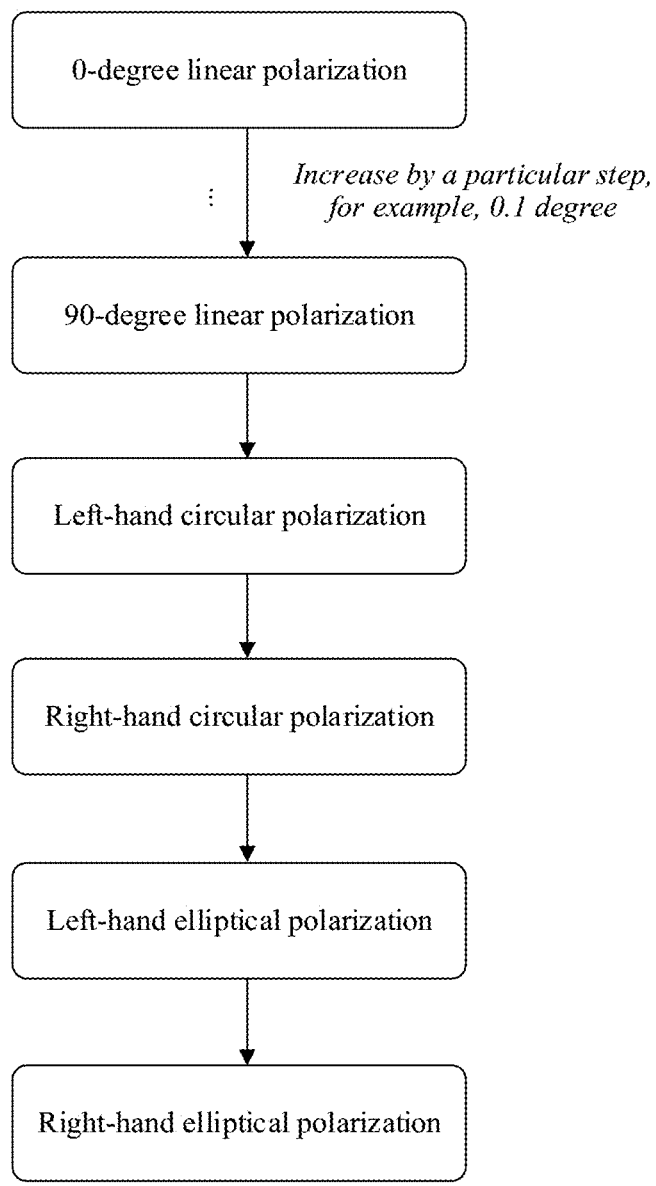
FIG. 2 is a schematic diagram of a polarization configuration manner.

FIG. 2 shows a possible case of a polarization configuration manner. A circular polarization direction periodically rotates at a constant speed in a range of ±180°, and an electric field strength in each direction is fixed, and an elliptical polarization direction periodically rotates at a constant speed in a range of ±180°, and an electric field strength in each direction is not fixed but regular. Circular polarization may be considered as special elliptical polarization with a major axis and a minor axis of an equal length, and linear polarization may be considered as special elliptical polarization with a minor axis length close to 0. It can be learned that, in a polarization traversal process of a receiving device or a transmitting device, the traversal can be freely switched between the circular polarization, the elliptical polarization, and the linear polarization.

In the embodiments of this application, a first polarization information set is formed after the transmitting device traverses all or some of polarization information in a polarization configuration diagram, a third polarization information set may include all polarization information in the polarization configuration diagram, or may include some polarization information in the polarization configuration diagram, and a second polarization information set is formed after the receiving device traverses the third polarization information set for N times, where N is a positive integer greater than or equal to 1, and a value of N is determined based on a quantity of pieces of first polarization information in the first polarization information set. Details are described in the following.

It should be noted that, the transmitting device may start the traversal of the polarization configuration diagram from any polarization information in the polarization configuration diagram, and may end at any polarization information.

In an existing NLOS channel, because the transmitting device transmits electromagnetic waves in different polarization directions and polarization shapes, energy losses of the electromagnetic waves introduced by penetration or refraction by an obstacle are different. Therefore, this application provides a method for determining polarization information, to find a polarization shape and a polarization direction for the transmitting device to perform transmission in an optimal manner, thereby reducing a physical loss in the NLOS channel. Descriptions are provided below with reference to FIG. 3.

301. The receiving device receives a first polarization information set sent by the transmitting device.

The transmitting device sets polarization information of a to-be-transmitted electromagnetic wave based on a polarization configuration diagram, until polarization information in the polarization configuration diagram is traversed once. The transmitting device may be triggered to perform traversal as scheduled. For example, the transmitting device performs traversal once every 10 minutes. A specific interval of scheduled triggering is not limited herein. Each time the transmitting device changes the polarization information, the receiving device needs to receive the latest first polarization information. After one traversal is completed, the transmitting device temporarily stops switching the polarization information, and all first polarization information received by the receiving device is the first polarization information set. The first polarization information includes a polarization shape and a polarization direction. The transmitting device sets the polarization shape and the polarization direction included in the first polarization information to a polarization shape and a polarization direction of the to-be-transmitted electromagnetic wave, and performs traversals in sequence.

When performing the polarization traversal according to a polarization configuration table, the transmitting device may set a polarization state at a step of one degree, for example, traverse in 30-degree linear polarization, 31-degree linear polarization, or 32-degree linear polarization, or set a polarization state at a step of five degrees as a step. A specific step of the polarization traversal is not limited herein.

For example, the polarization information in the first polarization information set includes 30-degree linear polarization, 60-degree linear polarization, left-hand circular polarization, and right-hand elliptical polarization. Therefore, the electromagnetic wave is transmitted in 30-degree linear polarization, 60-degree linear polarization, left-hand circular polarization, and right-hand elliptical polarization separately.

302. The receiving device determines a quality set of a received signal.

A transmit end transmits the electromagnetic wave based on the first polarization information. As shown in FIG. 1, a refraction and penetration situation by a tree is unknown, and an energy loss are inevitably caused. The transmit end performs transmission based on the first polarization information, where a corresponding polarization state is represented by TX-POL. After the electromagnetic wave passes through the NLOS channel, the polarization state changes from TX-POL to PT-POL due to refraction, penetration, or the like. In this case, the polarization state needs to be set to RX-POL on the receive end to match the PT-POL. Because energy losses of the electromagnetic waves in different TX-POL states through the NLOS channel are different, PT-POL states obtained after penetration are also different. Therefore, this embodiment aims at finding an optimal TX-POL to minimize the energy loss.

In this embodiment, both the polarization information and the polarization state refer to a polarization shape and a polarization direction of an electromagnetic wave. For example, if the first polarization information is left-hand elliptical polarization, a corresponding polarization state is also left-hand elliptical polarization.

Because energy losses caused by polarization states corresponding to each piece of first polarization information are different, quality of a received signal also changes after the electromagnetic wave passes through the NLOS channel. Therefore, each piece of first polarization information has unique corresponding quality of the received signal, and the quality of the received signal is also a set. The quality of the received signal is determined after the receiving device monitors a parameter of the received signal. The parameter that indicates the quality of the received signal may be any one or a combination of a receive level power RSL, a signal-to-noise ratio (signal noise ratio, SNR), and a signal to interference plus noise ratio (signal interference noise ratio, SINR). This is not specifically limited herein.

In this embodiment, there can be two cases for a unique correspondence between the first polarization information and the quality of the received signal, which are specifically:

1. The first polarization information is in a one-to-one correspondence with the quality of the received signal, that is, one piece of first polarization information corresponds to a unique quality of the received signal.

2. At least two pieces of first polarization information correspond to same quality of the received signal.

303. The receiving device determines optimal quality in the quality set.

The receiving device determines, in the determined quality set of the received signal, that quality with a minimum degradation degree of the received signal is the optimal quality of the received signal. The minimum degradation degree of the received signal may also be understood as a smallest energy loss of an electromagnetic wave whose polarization state is TX-POL and that is transmitted by the transmit end through the NLOS channel. For example, after the electromagnetic wave transmitted in the 30-degree linear polarization and the 60-degree linear polarization is transmitted through the NLOS channel, energy losses are 10 db and 15 db respectively. It can be learned that the energy loss of the electromagnetic wave transmitted in the 30-degree linear polarization is the smallest. Therefore, the quality with a degradation degree of the received signal corresponding to the electromagnetic wave transmitted in the 30-degree linear polarization is the smallest.

The optimal quality is quality with a minimum degradation degree of the received signal, and may be specifically understood from the following aspects:

I. The quality of the received signal is evaluated from a perspective of a signal parameter value.

1. Only one parameter is involved in the evaluation of the quality of the received signal. The parameter may be an RSL, an SNR, or an SINR, or may be another physical quantity of the received signal. This is not specifically limited herein.

The optimal quality of the received signal may be understood as a maximum value of the RSL, the SNR, or the SINR.

2. Only two or more parameters are involved in the evaluation of the quality of the received signal. The parameters may be an RSL, an SNR, and an SINR, or may be other physical quantities of the received signal. This is not specifically limited herein.

The quality of the received signal may be understood as: a sum of products of values of any two of the RSL, the SNR, and the SINR and their weight coefficients. The optimal quality of the received signal is quality of a received signal with a maximum sum. For example, if the quality of the received signal is measured by using the RSL and the SNR, the values of the RSL and the SNR are x and y respectively, and the weight coefficients are ⅖ and ⅗ respectively, the quality of the received signal is ⅖x+⅗y.

The quality of the received signal may alternatively be understood as a sum of products of the RSL value, the SNR value, and the SINR value and their weight coefficients, and the optimal quality of the received signal is quality of a received signal with a maximum sum.

II. The quality of the received signal is evaluated from a perspective of signal reliability.

In this embodiment, when the transmitting device sends a piece of first polarization information, the receiving device may detect the RSL of the received signal for a plurality of times, and determine a quantity of valid RSLs (that is, a value of the RSL is greater than a first threshold). A larger proportion of the quantity of valid RSLs to a total quantity of RSLs and a larger RSL value indicate better stability and better quality of the received signal.

In one example, when the quality of the received signal is lower than a second threshold, the RX end cannot receive a valid received signal. In this case, the quality of the received signal may be approximately 0. Because the received signal cannot be received by the receiving device, the receiving device automatically excludes the first polarization information sent by the transmitting device.

In this embodiment, in addition to the foregoing cases, more cases for determining the optimal quality may be further included. This is not specifically limited herein.

304. The receiving device sends the first polarization information corresponding to the optimal quality to the transmitting device.

After the receiving device receives the first polarization information set and determines the quality of the received signal corresponding to each piece of first polarization information, a table of correspondences between the polarization information and the quality may be formed. After determining the optimal quality, the receiving device reversely deduces the first polarization information corresponding to the optimal quality, and sends the first polarization information to the transmitting device, so that the transmitting device transmits the electromagnetic wave based on the first polarization information. In this case, the quality of the received signal is definitely optimal, to reduce an energy loss or signal degradation in the NLOS channel.

In one example, when there are two or more pieces of first polarization information corresponding to the optimal quality, the receiving device may send any one piece of the first polarization information corresponding to the optimal quality to the transmitting device.

In this embodiment, after receiving the first polarization information set traversed by the transmitting device, the receiving device determines the quality set of the received signal corresponding to the first polarization information set, to determine first polarization information that indicates the minimal degradation degree of the received signal. In this case, the transmitting device only needs to perform transmission based on the first polarization information, so that a loss caused by refraction or penetration in the NLOS channel can be minimized. In wireless communication, the degradation degree of the signal is reduced, so that user experience is improved.

This embodiment may be applied to a scenario in which a channel status keeps changing. When the status of the NLOS channel changes, the transmitting device can always determine, by performing the steps in the embodiment shown in FIG. 3, the first polarization information corresponding to the optimal signal quality and sends the first polarization information to the receiving device.

In this application scenario, a change to the NLOS channel may cause the degradation of the received signal. When the degradation degree of the received signal is excessively high and is greater than a preset threshold, the receiving device is triggered to perform the steps in the embodiment shown in FIG. 3. In another possible case, a scheduled triggering manner is used, and the receiving device is triggered to perform the steps in the embodiment shown in FIG. 3 after a preset time is reached. Alternatively, both scheduled triggering and signal degradation based triggering may be used. This is not specifically limited herein.

In an embodiment, because the transmit end continually switches the first polarization information based on the polarization configuration diagram, the polarization state TX-POL of the transmit end keeps changing, and the PT-POL also keeps changing. Therefore, the polarization state RX-POL of the receive end needs to keep changing to match the PT-POL. In this embodiment, when a dual-polarized antenna is used, the RX end may receive an electromagnetic wave in any polarization shape and direction. In other words, regardless of how the PT-POL changes, the electromagnetic wave can be received by the RX end in an optimal way. Therefore, the RX end does not need to switch the polarization state. In this case, the RSL of the signal degrades no more than 3 db. When the receive end uses a full-polarized antenna, a feature of the antenna is that, with a change to a receiving state of the TX end, the RX end needs to change accordingly, to achieve optimal matching between the PT-POL and the RX-POL, thereby reducing or even eliminating a defect of the RSL of 3 db in the description in which the full-polarized antenna is used. In this case, the polarization state of the RX end is also continually switched. Descriptions are provided below with reference to FIG. 4.

401. The receiving device receives a first polarization information set sent by the transmitting device.

In this embodiment, a manner in which the receiving device receives the first polarization information set sent by the transmitting device is similar to that in step 301 in the embodiment. Details are not described herein again.

402. The receiving device determines a second polarization information set.

Each time the receiving device receives the first polarization information, the receiving device itself needs to switch the polarization information to change a polarization state. Therefore, the receiving device needs to determine the second polarization information corresponding to the first polarization information, to perform switching based on the second polarization information.

Further, that the receiving device determines a second polarization information set includes:

A. The receiving device traverses a third polarization information set.

Polarization information of the transmitting device is the first polarization information. In this case, the TX-POL remains unchanged, but the RX-POL is unknown. Because the RX-POL states are different, the PT-POL and the RX-POL are different in matching, and energy losses are also different. Therefore, degradation degrees of the received signal are also different. In this case, the degradation of the received signal is not caused by a physical factor such as refraction or penetration in the NLOS channel, but is caused because the RX-POL cannot optimally match the PT-POL.

To achieve the optimal matching between the PT-POL and the RX-POL, after receiving the polarization information, the receiving device needs to traverse the third polarization information set.

B. The receiving device determines polarization information that is in the third polarization information set and that indicates the minimal degradation degree of the received signal.

The receiving device traverses the third polarization information set, that is, when the polarization state of the transmitting device remains unchanged, the receiving device continually switches the RX-POL based on the third polarization information. In this case, quality of the received signal also keeps changing, and the receiving device needs to determine the third polarization information that indicates the minimal degradation degree of the received signal.

C. The receiving device determines that the polarization information that indicates the minimal degradation degree of the received signal is the second polarization information.

The receiving device determines the polarization information that indicates the minimal degradation degree of the received signal as the required second polarization information.

Then, the transmitting device switches the first polarization information until all or some of the polarization information in the polarization configuration diagram is traversed, and the receiving device repeatedly performs steps A, B, and C until the second polarization information set is determined.

It can be learned that in this embodiment, there can be two correspondences between the second polarization information and the first polarization information, which may be:

1. The first polarization information is in a one-to-one correspondence with the second polarization information, that is, one piece of first polarization information corresponds to one piece of second polarization information.

2. At least two pieces of second polarization information correspond to same first polarization information.

In this embodiment, the first polarization information set includes N pieces of first polarization information. Therefore, the receiving device needs to traverse the third polarization information set for N times, and determines one piece of second polarization information at each time. In one example, second polarization information determined by traversing the third polarization information set for twice or more times is the same. Therefore, at least two pieces of second polarization information correspond to same first polarization information.

It should be noted that, in this embodiment, when the transmitting device transmits the electromagnetic wave based on the first polarization information, the receiving device also needs to synchronously receive the electromagnetic wave based on the second polarization information. For example, the first polarization information set includes a1, b1, c1, and d1, and a corresponding second polarization information set includes a2, b2, c2, and d2. The receive end transmits an electromagnetic wave based on a1, a polarization state of the receive end needs to be synchronously switched, and the electromagnetic wave is received based on a2.

The synchronous switching in this embodiment is not necessarily time synchronization, and there is a certain delay of the synchronous switching performed by the receive end relative to the transmit end. The delay is specifically a propagation delay of the received signal and a delay of processing the signal by the receiving device.

403. The receiving device determines a quality set of a received signal.

404. The receiving device determines optimal quality in the quality set.

405. The receiving device sends the first polarization information corresponding to the optimal quality to the transmitting device.

Figure 3:
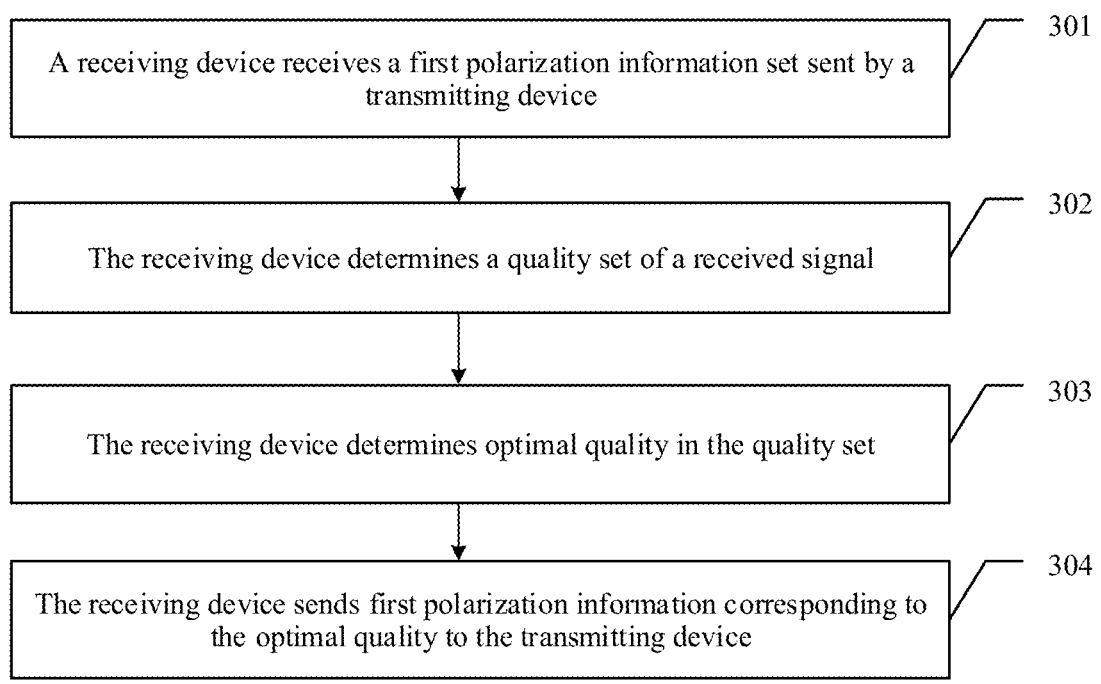
FIG. 3 is a schematic diagram of an embodiment of a method for determining polarization information according to an embodiment.

In this embodiment, step 403 to step 405 in the embodiment are similar to step 202 to step 204 in the embodiment shown in FIG. 3. Details are not described herein again.

406. The receiving device controls a polarization shape and a polarization direction of the receiving device based on the second polarization information corresponding to the optimal quality.

After the receiving device determines the second polarization information corresponding to the optimal quality, the receiving device sets a polarization state RX-POL (polarization shape and polarization direction) based on the polarization information, to match a polarization state PT-POL of the received electromagnetic wave.

In this embodiment, a case in which the polarization state of the receiving device also needs to be flexibly adjusted is described. The RX-POL can always be optimally matched with the PT-POL by flexible adjustment of the receiving device no matter how the PT-POL changes after the electromagnetic wave in a TX-POL state is transmitted after being penetrated. In this way, an energy loss caused by a mismatch of the polarization states is avoided. Similarly, due to a defect caused by a physical factor of the NLOS channel, in this application, the first polarization information corresponding to the optimal quality of the received signal is determined in a manner similar to that in the embodiment shown in FIG. 3, to control the transmitting device, and the second polarization information corresponding to the optimal quality of the received signal further needs to be determined to control the receiving device, so that a loss caused by refraction or penetration in the NLOS channel can be minimized. In wireless communication, the degradation degree of the signal is reduced, so that user experience is improved.

This embodiment may be applied to a scenario in which a channel status keeps changing. When the status of the NLOS channel keeps changing, the transmitting device performs the steps in the embodiment shown in FIG. 4, so that the receiving device and the transmitting device can automatically adjust to polarization states corresponding to the optimal quality. Therefore, regardless of how a signal changes, an energy loss can be minimized in the embodiments of this application.

In this application scenario, a change to the NLOS channel may cause the degradation of the received signal. When the degradation degree of the received signal is excessively high and is greater than a preset threshold, the receiving device is triggered to perform the steps in the embodiment shown in FIG. 4. In another possible case, a scheduled triggering manner is used, and the receiving device is triggered to perform the steps in the embodiment shown in FIG. 4 after a preset time is reached. Alternatively, both scheduled triggering and signal degradation based triggering may be used. This is not specifically limited herein.

In this embodiment, a case in which the degradation degree of the received signal is excessively high and is greater than a preset threshold is that the received signal is severely degraded, and a value of the RSL is lower than receiving sensitivity of the RX. In this case, the RX end cannot receive the signal. The preset threshold is a preset reduced value of the RSL of the received signal. For example, the preset threshold is 10 db. When the reduced value of the RSL of the received signal exceeds 10 db, the transmitting device performs polarization traversal again, and correspondingly, the receiving device also starts to receive the first polarization information set again.

In this embodiment, a preset periodicity is a preset time periodicity, which may be 5 s or 10 s. After the preset time periodicity is reached, the transmitting device starts to traverse the polarization information in the polarization configuration diagram to generate the first polarization information set, and the receiving device also triggers the step of receiving the first polarization information set. Therefore, the transmitting device triggers, at intervals of a preset time periodicity, to perform polarization traversal.

Figure 4:
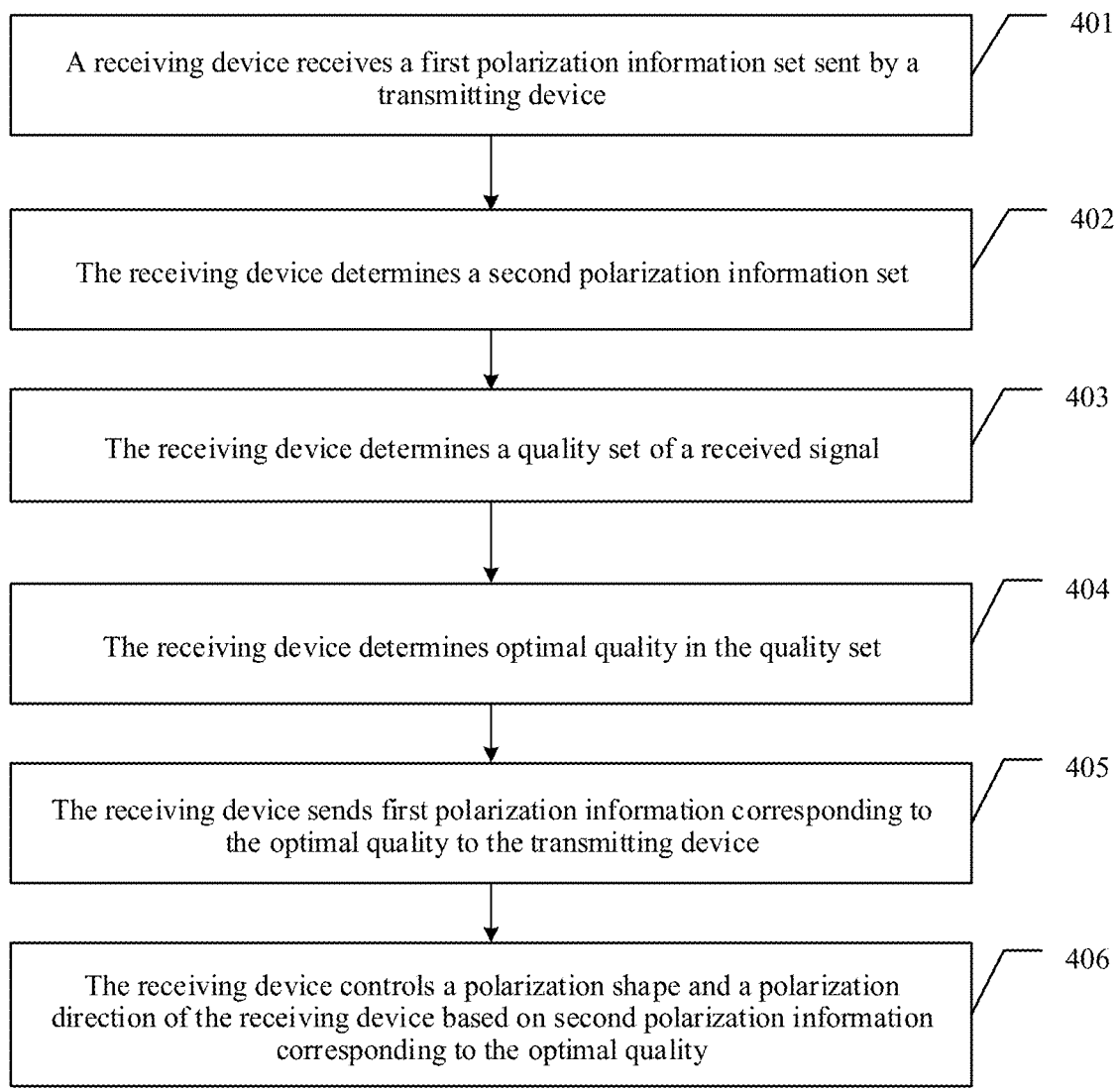
FIG. 4 is a schematic diagram of another embodiment of a method for determining polarization information according to an embodiment.
Figure 5:
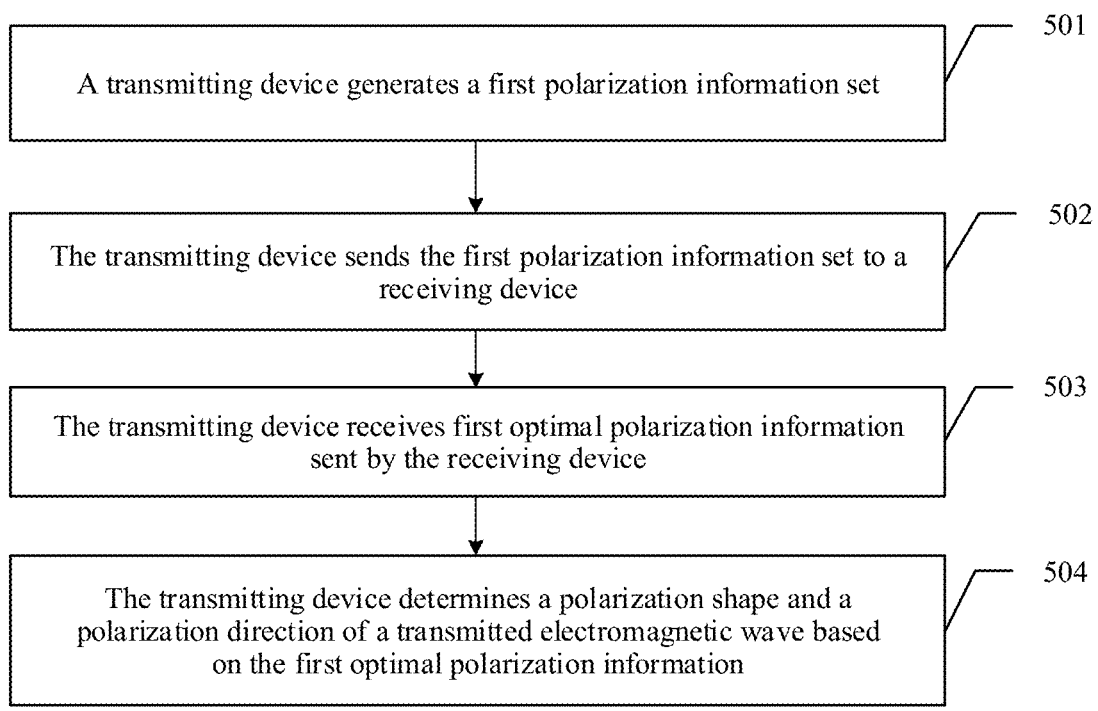
FIG. 5 is a schematic diagram of another embodiment of a method for determining polarization information according to an embodiment.

Various embodiments are described in FIG. 3 and FIG. 4 from a perspective of the receiving device. Referring to FIG. 5, an embodiment is described below from a perspective of a transmitting device.

501. The transmitting device generates a first polarization information set.

The transmitting device traverses all or some of the polarization information in a polarization configuration diagram, and continually switches a polarization state (that is, a polarization shape and a polarization direction) of a transmitted electromagnetic wave. The polarization states traversed by the transmitting device forms the first polarization information set.

A specific step in which the transmitting device performs a polarization traversal based on a polarization configuration table is similar to step 301 in the embodiment. Details are not specifically limited herein.

502. The transmitting device sends the first polarization information set to the receiving device.

When traversing the polarization configuration diagram, the transmitting device transmits an electromagnetic wave at each time based on one piece of first polarization information, and the transmission is repeatedly performed, so that the transmitting device sends the first polarization information to the receiving device. After the transmitting device completes the traversal, the receiving device receives the first polarization information set.

After receiving the first polarization information set, the receiving device needs to determine quality that is of a received signal and that uniquely corresponds to the first polarization information in the first polarization information set, and the quality of the received signal belongs to a quality set of the received signal.

In this embodiment, a manner of determining the quality of the received signal is similar to that in step 302 in the embodiment. Details are not described herein again.

In this embodiment, a correspondence between the first polarization information and the quality of the received signal is similar to that in step 302 in the embodiment. Details are not described herein again.

In one example, when the receiving device uses a full-polarized antenna, there is also a second polarization information set. The first polarization information set may be used by the receiving device to determine the second polarization information set. A manner of determining the second polarization information set is similar to that of A, B, and C in embodiment 402. Details are not described herein again.

In this embodiment, the second polarization information is used to control a polarization state RX-POL of the transmitting device to match a polarization state PT-POL of the received electromagnetic wave. The first polarization information in the first polarization information set corresponds to unique second polarization information in the second polarization information set. A specific correspondence is similar to that in step 402 in the embodiment. Details are not described herein again.

In this embodiment, the transmitting device switches a polarization state TX-POL of the transmitted electromagnetic wave based on the first polarization information. In this case, the receiving device needs to synchronously switch the polarization state RX-POL of the receiving device based on the second polarization information corresponding to the first polarization information. A synchronization manner is similar to that in step 402 in this embodiment. Details are not described herein again.

503. The transmitting device receives first optimal polarization information sent by the receiving device.

In this embodiment, the first optimal polarization information is polarization information that is in the first polarization information set and that indicates a minimal degradation degree of the received signal, and the first optimal polarization information corresponds to optimal quality of the received signal. A manner of determining the optimal quality is similar to the first or the second case described in step 303 in the embodiment. Details are not described herein again.

504. The transmitting device determines a polarization shape and a polarization direction of the transmitted electromagnetic wave based on the first optimal polarization information.

In this embodiment, the transmitting device sends the first polarization information set formed through traversal to the receiving device, so that the receiving device determines the quality set of the received signal corresponding to the first polarization information set, to determine first polarization information that indicates the minimal degradation degree of the received signal. In this case, the receiving device only needs to receive the first optimal polarization information, and transmit the electromagnetic wave based on the first optimal polarization information, so that a loss caused by refraction or penetration in the NLOS channel can be minimized. In wireless communication, the degradation degree of the signal is reduced, so that user experience is improved.

This embodiment may be applied to a scenario in which a channel status keeps changing. When the status of the NLOS channel keeps changing, the transmitting device performs the steps in the embodiment shown in FIG. 5, so that the receiving device and the transmitting device can automatically adjust to polarization states corresponding to the optimal quality. Therefore, regardless of how a signal changes, an energy loss can be minimized in the embodiments of this application.

In this application scenario, a change to the NLOS channel may cause the degradation of the received signal. When the degradation degree of the received signal is excessively high and is greater than a preset threshold, the transmitting device is triggered to perform the steps in the embodiment shown in FIG. 5. In another possible case, a scheduled triggering manner is used, and the transmitting device is triggered to perform the steps in the embodiment shown in FIG. 5 after a preset time is reached. Alternatively, both scheduled triggering and signal degradation based triggering may be used. This is not specifically limited herein.

Figure 6:
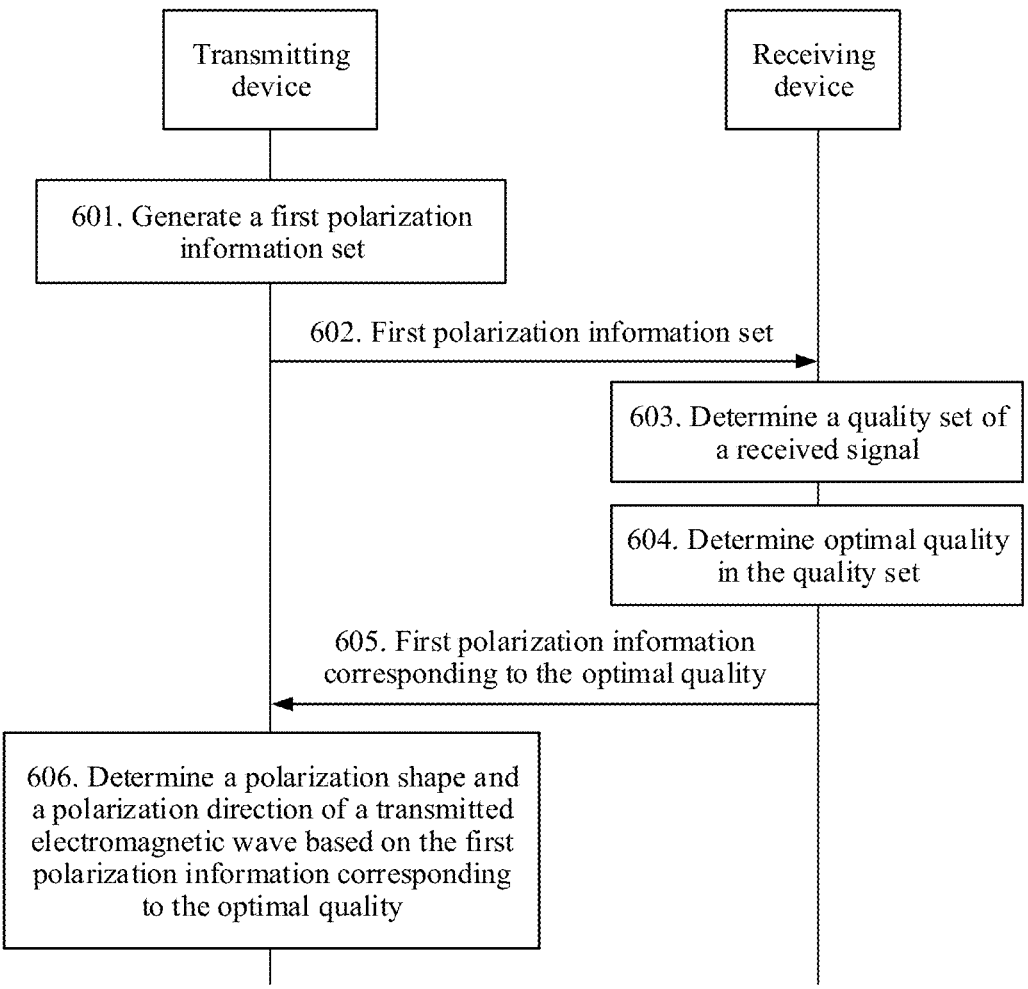
FIG. 6 is a schematic diagram of another embodiment of a method for determining polarization information according to an embodiment.

In an embodiment, information exchange between the transmitting device and the receiving device is performed through a control channel. Descriptions are provided below with reference to FIG. 6.

601. The transmitting device generates a first polarization information set.

602. The transmitting device sends the first polarization information set to the receiving device.

In this embodiment, step 601 and step 602 in the embodiment are similar to step 501 and step 502 in the embodiment shown in FIG. 5. Details are not described herein again.

603. The receiving device determines a quality set of a received signal.

604. The receiving device determines optimal quality in the quality set.

605. The receiving device sends the first polarization information corresponding to the optimal quality to the transmitting device.

In this embodiment, step 603 to step 605 in the embodiment are similar to step 302 to step 304 in the embodiment shown in FIG. 3. Details are not described herein again.

606. The transmitting device determines a polarization shape and a polarization direction of a transmitted electromagnetic wave based on the first polarization information corresponding to the optimal quality.

In this embodiment, step 605 in the embodiment is similar to step 504 in the embodiment shown in FIG. 5. Details are not described herein again.

It should be noted that, the transmitting device may transmit the first polarization information to the receiving device through a control channel. There are two types of control channels: an associated control channel and a bypass control channel.

1. Control information of the associated control channel and a data channel are on a same physical channel. Therefore, after carrying the first polarization information set in control information of the associated control channel, the transmitting device sends the control information to the receiving device, so that information can be transferred between the receiving device and the transmitting device.

2. A control channel of the bypass control channel and a data channel are on different physical channels. The transmitting device sends the first polarization information to the receiving device through the bypass control channel. After receiving data streams, the receiving device cannot determine a correspondence between the data streams and the polarization information. Therefore, the data streams need to be matched with the first polarization information, and then the first polarization information is determined based on the data streams and matching results, until all first polarization information in the first polarization information set is determined.

In this embodiment, after the transmitting device traverses the polarization configuration diagram once, the receiving device needs to detect quality of the received signal generated by the transmitting device in each polarization state, to determine first polarization information that indicates the minimal degradation degree of the received signal, and the transmitting device transmits an electromagnetic wave based on the polarization information. In this way, a physical loss in the NLOS channel can be minimized.

This embodiment may be applied to a scenario in which a channel status keeps changing. When the status of the NLOS channel keeps changing, the transmitting device and the receiving device perform the steps in the embodiment shown in FIG. 6, so that the receiving device and the transmitting device can automatically adjust to polarization states corresponding to the optimal quality. Therefore, regardless of how a signal changes, an energy loss can be minimized in the embodiments of this application.

In this application scenario, a change to the NLOS channel may cause the degradation of the received signal. When the degradation degree of the received signal is excessively high and is greater than a preset threshold, the transmitting device is triggered to perform the step of traversing the polarization shape and the polarization direction of the transmitted electromagnetic wave and generating the first polarization information set. In another possible case, a scheduled triggering manner is used. After a preset time is reached, the transmitting device triggers to perform the step of traversing the polarization shape and polarization direction of the transmitted electromagnetic wave and generating the first polarization information set. Alternatively, both scheduled triggering and signal degradation based triggering may be used. This is not specifically limited herein.

The embodiments of this application are described in FIG. 3 to FIG. 6 from a perspective of the method for determining polarization information. Referring to FIG. 7(*a*), an embodiment is described below from a perspective of a receiving device.

An embodiment provides a receiving device, including:

an obtaining unit 701, configured to obtain a first polarization information set sent by the transmitting device through a control channel, where the first polarization information set includes at least one piece of first polarization information, and the first polarization information includes a polarization shape and a polarization direction of a transmitted electromagnetic wave of the transmitting device;

a determining unit 702, configured to determine a quality set of a received signal, where the quality set includes at least one piece of quality, the first polarization information corresponds to unique quality, and the received signal is a signal sent by the transmitting device to the receiving device through a non-line-of-sight NLOS channel, and the determining unit 702 is further configured to determine optimal quality in the quality set, where the optimal quality is quality that is in the quality set and that minimizes a degradation degree of the received signal; and a sending unit 703, configured to send the first polarization information corresponding to the optimal quality to the transmitting device.

In this embodiment, after the obtaining unit obtains the first polarization information set of the transmitted electromagnetic wave, the determining unit determines a received signal with a minimum signal degradation degree in the quality set of the received signal corresponding to the first polarization information set, and then sends first polarization information corresponding to the received signal with the minimum signal degradation degree to the transmitting device, to control the transmitting device to transmit the electromagnetic wave.

Further, in this embodiment, in a possible case, polarization information of the receiving device also needs to change, to match a change of the first polarization information sent by the transmitting device.

The determining unit 702 is further configured to determine a second polarization information set. The first polarization information in the first polarization information set corresponds to unique second polarization information in the second polarization information set, and the second polarization information includes a polarization shape and a polarization direction of the receiving device.

For a full-polarized antenna, the receiving device needs to synchronously update to the second polarization information with a change to the first polarization information sent by the transmitting device, so that PT-POL and RX-POL are optimally matched, thereby avoiding a defect caused by mismatch between a polarization state of the receive end and a polarization state of the transmit end.

Figure 7A:
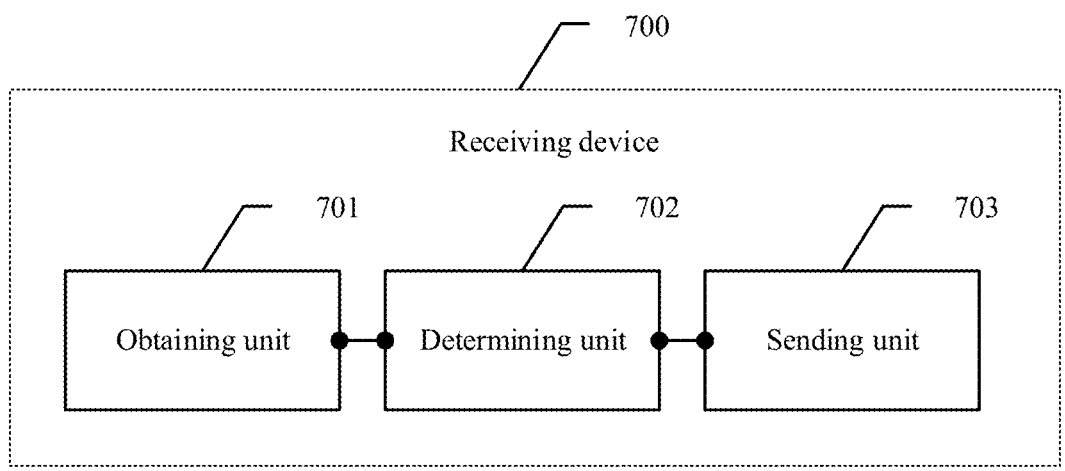
FIG. 7(a) is a schematic diagram of an embodiment of a receiving device according to an embodiment.
Figure 7B:
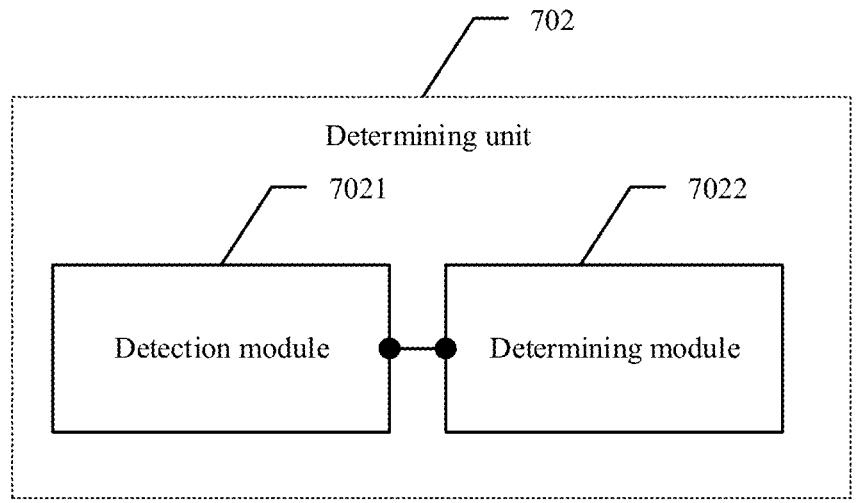
FIG. 7(b) is a schematic diagram of an embodiment of a receiving device according to an embodiment.

In this embodiment shown in FIG. 7(a), further, referring to FIG. 7(b), the determining unit specifically includes:

a detection module 7021, configured to detect the received signal; and a determining module 7022, configured to determine, based on a detection result, quality of the received signal corresponding to each piece of first polarization information.

In this embodiment, a manner of determining the quality set is described, thereby improving feasibility of the solution.

In an embodiment, after determining the optimal quality of the received signal, the receiving device also needs to adjust a polarization state. Descriptions are provided below with reference to FIG. 8.

An obtaining unit 801 is configured to obtain a first polarization information set sent by the transmitting device through a control channel, where the first polarization information set includes at least one piece of first polarization information, and the first polarization information includes a polarization shape and a polarization direction of a transmitted electromagnetic wave of the transmitting device.

A determining unit 802 is configured to determine a second polarization information set, where the first polarization information in the first polarization information set corresponds to unique second polarization information in the second polarization information set, and the second polarization information includes a polarization shape and a polarization direction of the receiving device.

The determining unit 802 is further configured to determine a quality set of a received signal. The quality set includes at least one piece of quality, the first polarization information corresponds to unique quality, and the received signal is a signal sent by the transmitting device to the receiving device through a non-line-of-sight NLOS channel.

The determining unit 802 is further configured to determine optimal quality in the quality set. The optimal quality is quality that is in the quality set and that minimizes a degradation degree of the received signal.

A sending unit 803 is configured to send the first polarization information corresponding to the optimal quality to the transmitting device.

A control unit 804 is configured to control the polarization shape and the polarization direction of the receiving device based on the second polarization information corresponding to the optimal quality.

In this embodiment, after the transmitting device adjusts the transmitted electromagnetic wave based on the first polarization information corresponding to the optimal quality, the receiving device also needs to synchronously adjust a polarization state of the receiving device based on the second polarization information corresponding to the optimal quality, so that a physical loss caused by an NLOS channel is minimized.

Figure 8:
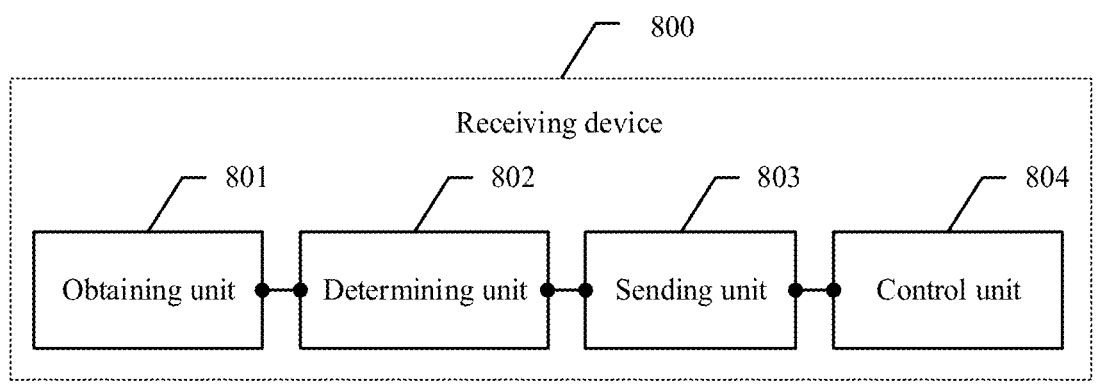
FIG. 8 is a schematic diagram of another embodiment of a receiving device according to an embodiment.
Figure 9:
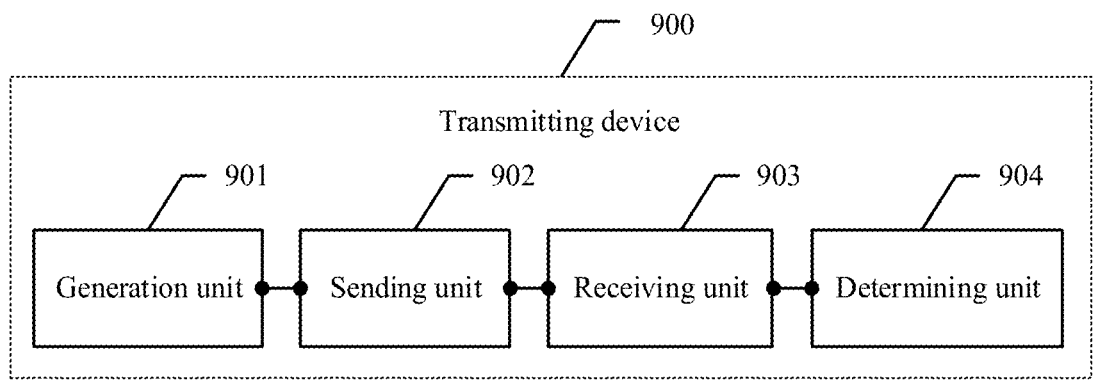
FIG. 9 is a schematic diagram of an embodiment of a transmitting device according to an embodiment.

The embodiments of this application are described in FIG. 7(a), FIG. 7(b), and FIG. 8 from a perspective of the receiving device. Referring to FIG. 9, an embodiment is described below from a perspective of a transmitting device.

A generation unit 901 is configured to generate a first polarization information set, where the first polarization information set includes at least one piece of first polarization information, and the first polarization information includes a polarization shape and a polarization direction of the transmitted electromagnetic wave of the transmitting device.

A sending unit 902 is configured to send the first polarization information set to the receiving device, where the first polarization information set is used by the receiving device to determine a quality set of a received signal, the quality set includes at least one piece of quality, the first polarization information corresponds to unique quality, and the received signal is a signal sent by the transmitting device to the receiving device through a non-line-of-sight NLOS channel.

A receiving unit 903 is configured to receive first optimal polarization information sent by the receiving device, where the first optimal polarization information belongs to the first polarization information set, the first optimal polarization information corresponds to the optimal quality, the optimal quality is determined by the receiving device, and the optimal quality is quality that is in the quality set and that minimizes a degradation degree of the received signal.

A determining unit 904 is configured to determine the polarization shape and the polarization direction of the transmitted electromagnetic wave based on the first optimal polarization information.

In this embodiment, a traversing unit traverses the polarization shape and a polarization state of the transmitted electromagnetic wave, to form the first polarization information set, and sends the set to the receiving device. Then the receiving unit receives the first optimal polarization information from the receiving device. Therefore, the determining unit may determine a polarization state of the transmitting device based on the first optimal polarization information.

Figure 10A:
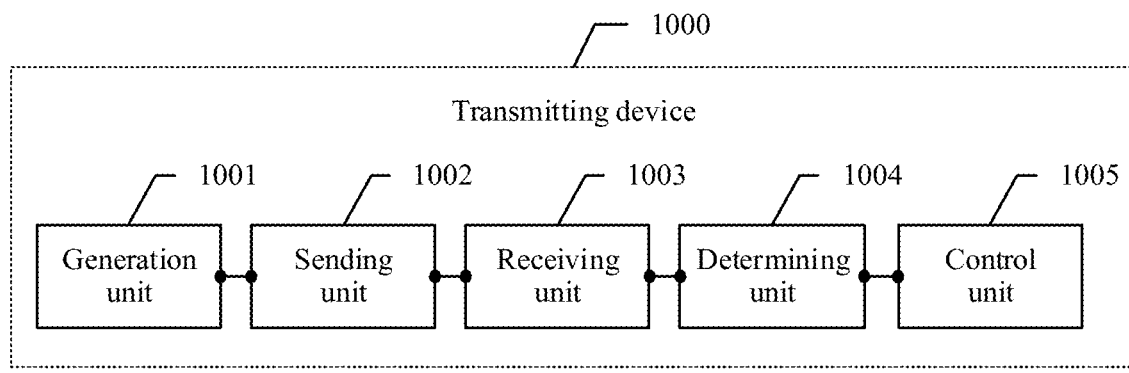
FIG. 10(a) is a schematic diagram of another embodiment of a transmitting device according to an embodiment.

In this embodiment, after determining the first optimal polarization information, the receiving device needs to switch polarization information of the receiving device to the first polarization information. Descriptions are provided below with reference to FIG. 10(a).

A generation unit 1001 is configured to generate a first polarization information set, where the first polarization information set includes at least one piece of first polarization information, and the first polarization information includes a polarization shape and a polarization direction of the transmitted electromagnetic wave of the transmitting device A sending unit 1002 is configured to send the first polarization information set to the receiving device, where the first polarization information set is used by the receiving device to determine a quality set of a received signal, the quality set includes at least one piece of quality, the first polarization information corresponds to unique quality, and the received signal is a signal sent by the transmitting device to the receiving device through a non-line-of-sight NLOS channel.

A receiving unit 1003 is configured to receive first optimal polarization information sent by the receiving device, where the first optimal polarization information belongs to the first polarization information set, the first optimal polarization information corresponds to the optimal quality, the optimal quality is determined by the receiving device, and the optimal quality is quality that is in the quality set and that minimizes a degradation degree of the received signal.

A determining unit 1004 is configured to determine the polarization shape and the polarization direction of the transmitted electromagnetic wave based on the first optimal polarization information.

Further, the receiving device further includes:

a control unit 1005, configured to: when the receiving device controls a polarization shape and a polarization direction of the receiving device based on the second polarization information corresponding to the optimal quality, control a polarization shape and a polarization direction of the antenna unit based on the first optimal polarization information corresponding to the optimal quality.

In this embodiment, when the transmitting device transmits the electromagnetic wave based on the first optimal polarization information, and the receiving device receives the electromagnetic wave by setting a polarization state based on the second polarization information corresponding to the optimal quality, the quality of the received signal is optimal. Therefore, a physical loss caused by an NLOS channel can be minimized.

Figure 10B:
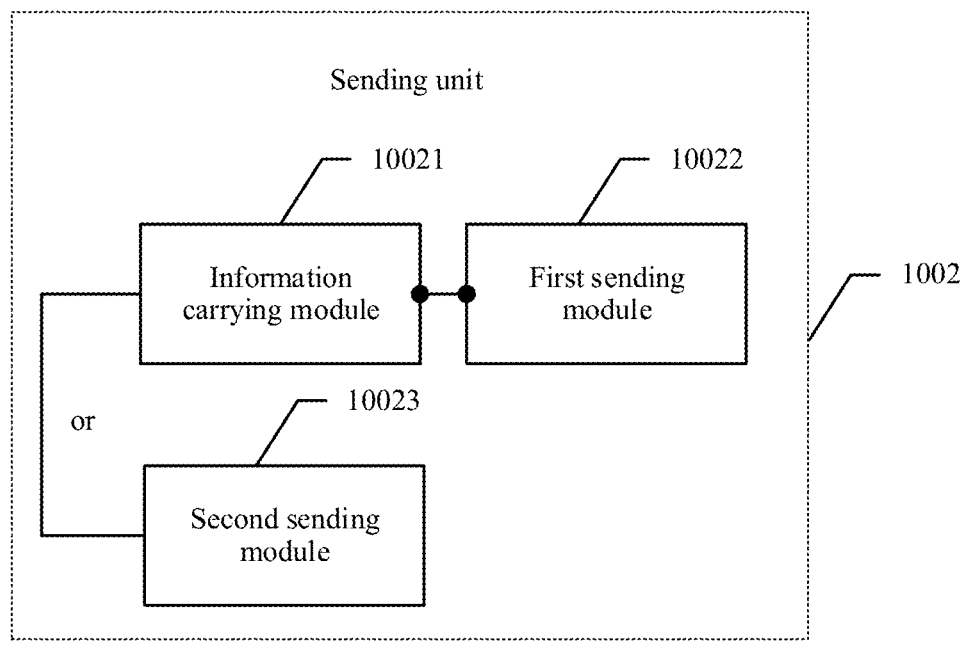
FIG. 10(b) is a schematic diagram of another embodiment of a transmitting device according to an embodiment.

Further, in this embodiment, information exchange between the receiving device and the transmitting device is performed through a control channel. Control information is sent in different manners based on different types of control channels. Descriptions are provided below with reference to FIG. 10(*b*).

The sending unit 1002 includes:

an information carrying module 10021, configured to carry the first polarization information set in control information of an associated control channel; and a first sending module 10022, configured to send the control information to the receiving device; or a second sending module 10023, further configured to send the first polarization information set to the receiving device through a bypass control channel, so that when the receiving device determines that the first polarization information is transmitted through the bypass control channel, the receiving device matches a received data stream with the first polarization information, and then determines the first polarization information based on the data stream and a matching result, until all first polarization information in the first polarization information set is determined.

The receiving device in the embodiments of this application may be applied to a microwave or wireless communications system. In a possible design, the receiving device includes a radio frequency circuit 1104, a baseband circuit 1105, a controller 1101, a feeding network 1102, and an antenna 1103.

The controller 1101 may receive quality of a received signal fed back by at least one of the radio frequency circuit 1104 and the baseband circuit 1105, and the received signal is a signal sent by the transmitting device to the receiving device through a non-line-of-sight NLOS channel.

Figure 11:
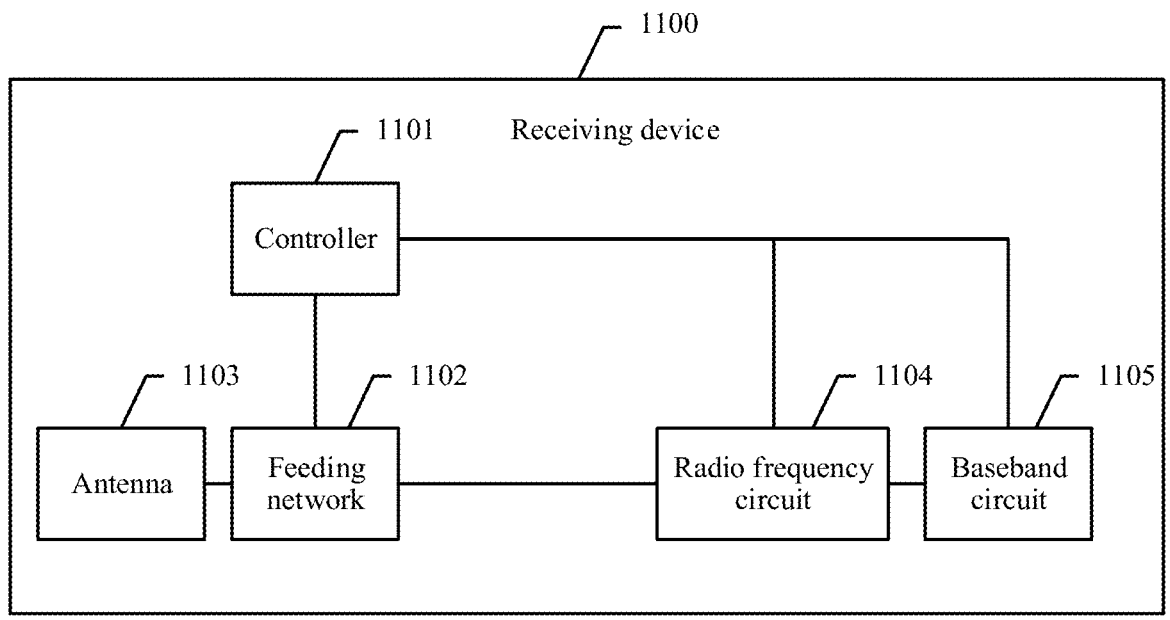
FIG. 11 is a schematic diagram of another embodiment of a receiving device according to an embodiment.
Figure 12:
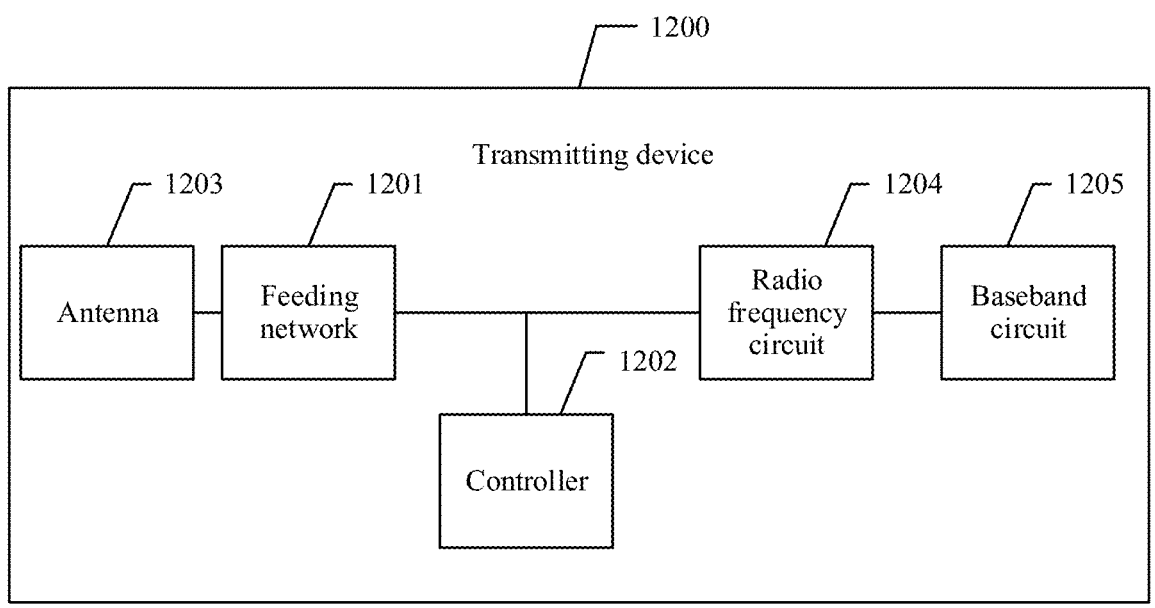
FIG. 12 is a schematic diagram of another embodiment of a transmitting device according to an embodiment.

It should be noted that the receiving device may include both the radio frequency circuit 1104 and the baseband circuit 1105, or the receiving device may include only either of the radio frequency circuit 1104 and the baseband circuit 1105. When the receiving device includes both the radio frequency circuit 1104 and the baseband circuit 1105, a first interface of the controller 1101 is connected to at least one of the radio frequency circuit 1104 and the baseband circuit 1105. In FIG. 11, for example, the controller 1101 is connected to both the radio frequency circuit 1104 and the baseband circuit 1105, and the radio frequency circuit 1104 is connected to the baseband circuit 1105.

When the receiving device includes only the radio frequency circuit 1104 or the baseband circuit 1105, a first interface of the controller 1101 is connected to the radio frequency circuit 1104 or the baseband circuit 1105 included in the receiving device.

A second interface of the controller 1101 is connected to the transmitting device, and the controller 1101 may exchange information with the transmitting device.

A third interface of the controller 1101 is connected to the feeding network 1102, the controller 1101 may send polarization information to the feeding network 1102, the feeding network 1102 may control a polarization state of the antenna based on the polarization information, and the feeding network 1102 is connected to the antenna 1103.

The transmitting device in the embodiments of this application may be applied to a microwave or wireless communications system. In a possible design, the transmitting device includes a baseband circuit 1205, a radio frequency circuit 1204, a controller 1202, a feeding network 1201, and an antenna 1203.

The controller 1202 is connected to a first interface of the feeding network 1201, and the controller 1202 may send polarization information to the feeding network 1201.

A second interface of the feeding network 1201 is connected to the radio frequency circuit 1204, the radio frequency circuit 1204 is connected to the baseband circuit 1205, and the feeding network 1201 may receive an electrical signal from the radio frequency circuit 1204.

A third interface of the feeding network 1201 is connected to the antenna 1203, and the feeding network 1201 may control a polarization state of the antenna 1203.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any functions that can be completed by a computer program can be easily implemented by using corresponding hardware. Moreover, a specific hardware structure used to implement a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method for determining polarization information, comprising:
   receiving, by a receiving device, a first polarization information set sent by a transmitting device, wherein the first polarization information set comprises at least one piece of first polarization information, the first polarization information comprising information indicating a polarization shape and a polarization direction of a transmitted electromagnetic wave of the transmitting device;
   determining, by the receiving device, a quality set of a received signal, wherein the quality set comprises at least one piece of quality, the first polarization information corresponds to a quality of the received signal, the received signal being a signal sent by the transmitting device to the receiving device through a non-line-of-sight (NLOS) channel;
   determining, by the receiving device, an optimal quality in the quality set, wherein the optimal quality is a quality that has a minimum degradation degree of the received signal in the quality set; and
   sending, by the receiving device, the first polarization information corresponding to the optimal quality to the transmitting device.

2. The method according to claim 1, wherein after receiving, by the receiving device, the first polarization information set sent by the transmitting device, the method further comprises:
   determining, by the receiving device, a second polarization information set, wherein the first polarization information in the first polarization information set corresponds to second polarization information in the second polarization information set, and the second polarization information comprises a polarization shape and a polarization direction of the receiving device.

3. The method according to claim 2, wherein when polarization information of the transmitting device is the first polarization information, the second polarization information is polarization information that is in a third polarization information set and that indicates the minimum degradation degree of the received signal, wherein the third polarization information set comprises at least one piece of third polarization information, and the third polarization information comprises the polarization shape and the polarization direction of the receiving device.

4. The method according to claim 2, wherein after determining, by the receiving device, the optimal quality in the quality set, the method further comprises:
   controlling, by the receiving device, the polarization shape and the polarization direction of the receiving device based on the second polarization information corresponding to the optimal quality.

5. The method according to claim 1, wherein determining, by the receiving device, the quality set of a received signal comprises:
   detecting, by the receiving device, the received signal; and
   determining, by the receiving device based on a detection result, a quality of the received signal corresponding to each piece of first polarization information.

6. The method according to claim 1, wherein the quality of the received signal is at least one of a receive level power RSL, a signal-to-noise ratio (SNR), or a signal to interference plus noise ratio (SINR) of the received signal.

7. The method according to claim 1, wherein the method further comprises:
   when the degradation degree of the received signal is greater than a preset threshold, triggering, by the receiving device, the step of receiving the first polarization information set sent by the transmitting device; or
   after a preset time periodicity is reached, triggering, by the receiving device, the step of receiving the first polarization information set sent by the transmitting device.

8. A method for determining polarization information, comprising:
   generating, by a transmitting device, a first polarization information set, wherein the first polarization information set comprises at least one piece of first polarization information, the first polarization information comprising information indicating a polarization shape and a polarization direction of the transmitted electromagnetic wave of the transmitting device;
   sending, by the transmitting device, the first polarization information set to the receiving device, wherein the first polarization information set is used by the receiving device to determine a quality set of a received signal, the quality set comprises at least one piece of quality, the first polarization information corresponds to a quality of the received signal, and the received signal is a signal sent by the transmitting device to the receiving device through a non-line-of-sight (NLOS) channel;

receiving, by the transmitting device, first optimal polarization information sent by the receiving device, wherein the first optimal polarization information belongs to the first polarization information set, and the first optimal polarization information corresponds to an optimal quality, the optimal quality is quality that has a minimum degradation degree of the received signal in the quality set; and determining, by the transmitting device, the polarization shape and the polarization direction of the transmitted electromagnetic wave based on the first optimal polarization information.

9. The method according to claim 8, wherein sending, by the transmitting device, the first polarization information set to the receiving device comprises:

carrying, by the transmitting device, the first polarization information set in control information of an associated control channel; and performing, by the transmitting device, one of the following:

sending, by the transmitting device, the control information to the receiving device; or sending, by the transmitting device, the first polarization information set to the receiving device through a bypass control channel, so that when the receiving device determines that the first polarization information is transmitted through the bypass control channel, the receiving device matches a received data stream with the first polarization information, and then determines the first polarization information based on the data stream and a matching result, until all first polarization information in the first polarization information set is determined.

10. The method according to claim 8, wherein the method further comprises:

when the degradation degree of the received signal is greater than a preset threshold, triggering, by the transmitting device, the step of generating the first polarization information set; or after a preset time periodicity is reached, triggering, by the transmitting device, the step of generating the first polarization information set.

11. A receiving device, wherein the receiving device comprises a controller, a receiver, and a transmitter, wherein the receiver is configured to obtain a first polarization information set sent by the transmitting device through a control channel, wherein the first polarization information set comprises at least one piece of first polarization information, the first polarization information comprising information indicating a polarization shape and a polarization direction of a transmitted electromagnetic wave of the transmitting device;

the controller is configured to determine a quality set of a received signal, wherein the quality set comprises at least one piece of quality, the first polarization information corresponds to a quality of the received signal, the received signal being a signal sent by the transmitting device to the receiving device through a non-line-of-sight (NLOS) channel, and the controller is further configured to determine an optimal quality in the quality set, wherein the optimal quality is quality that has a minimum degradation degree of the received signal in the quality set; and the transmitter is configured to send the first polarization information corresponding to the optimal quality to the transmitting device.

12. The receiving device according to claim 11, wherein the controller is further configured to determine a second polarization information set, the first polarization information in the first polarization information set corresponds to second polarization information in the second polarization information set, and the second polarization information comprises a polarization shape and a polarization direction of the receiving device.

13. The receiving device according to claim 12, wherein when polarization information of the transmitting device is the first polarization information, the second polarization information is polarization information that is in a third polarization information set and that indicates the minimal degradation degree of the received signal, the third polarization information set comprises at least one piece of third polarization information, and the third polarization information comprises the polarization shape and the polarization direction of the receiving device.

14. The receiving device according to claim 12, wherein the receiving device further comprises a feeding network and an antenna, wherein the feeding network is configured to control a polarization shape and a polarization direction of the antenna based on the second polarization information corresponding to the optimal quality.

15. The receiving device according to claim 11, wherein the receiving device further comprises a radio frequency circuit and/or a baseband circuit, wherein the radio frequency circuit and/or the baseband circuit are/is configured to detect the received signal; and configured to determine, based on a detection result, quality of the received signal corresponding to each piece of first polarization information.

16. The receiving device according to claim 11, wherein the quality of the received signal determined by the controller is at least one of a receive level power (RSL), a signal-to-noise ratio (SNR), and a signal to interference plus noise ratio (SINR) of the received signal.

17. The receiving device according to claim 11, wherein the controller is further configured to: when the degradation degree of the received signal is greater than a preset threshold, trigger the step of receiving the first polarization information set sent by the transmitting device; or the controller is further configured to: after a preset time periodicity is reached, trigger the step of receiving the first polarization information set sent by the transmitting device.

18. The receiving device according to claim 11, wherein the controller comprises a first interface, a second interface, and a third interface, and the first interface of the controller is connected to the transmitting device through the control channel;

the receiving device further comprises a radio frequency circuit and/or a baseband circuit, and the second interface of the controller is connected to at least one of the radio frequency circuit and the baseband circuit; and the receiving device further comprises a feeding network and an antenna, the third interface of the controller is connected to the feeding network, and the feeding network is connected to the antenna.

* * * * *